United States Patent
Recio, III et al.

(10) Patent No.: US 11,643,589 B2
(45) Date of Patent: May 9, 2023

(54) METHODS AND COMPOSITIONS FOR HYDROCARBON RECOVERY

(71) Applicant: Halliburton Energy Services, Inc., Houston, TX (US)

(72) Inventors: Antonio Recio, III, Humble, TX (US); Aaron Michael Beuterbaugh, Spring, TX (US); Enrique Antonio Reyes, Tomball, TX (US); Kristina Henkel Holan, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/283,177

(22) PCT Filed: Nov. 13, 2018

(86) PCT No.: PCT/US2018/060617
§ 371 (c)(1),
(2) Date: Apr. 6, 2021

(87) PCT Pub. No.: WO2020/101644
PCT Pub. Date: May 22, 2020

(65) Prior Publication Data
US 2021/0355370 A1    Nov. 18, 2021

(51) Int. Cl.
*E21B 43/16* (2006.01)
*C09K 8/584* (2006.01)

(52) U.S. Cl.
CPC .............. *C09K 8/584* (2013.01); *E21B 43/16* (2013.01)

(58) Field of Classification Search
CPC ................................. C09K 8/584; E21B 43/16
(Continued)

(56) References Cited

U.S. PATENT DOCUMENTS

| | | | |
|---|---|---|---|
| 7,348,297 B2 | 3/2008 | Smith et al. | |
| 7,893,010 B2 * | 2/2011 | Ali | ............................ C09K 8/68 |
| | | | 507/219 |

(Continued)

FOREIGN PATENT DOCUMENTS

| | | |
|---|---|---|
| WO | 2014110058 A1 | 7/2014 |
| WO | 2017099706 A1 | 6/2017 |
| WO | 2017099709 A1 | 6/2017 |

OTHER PUBLICATIONS

International Search Report and Written Opinion issued in related PCT Application No. PCT/US2018/060617 dated Aug. 12, 2019, 10 pages.

(Continued)

*Primary Examiner* — William D Hutton, Jr.
*Assistant Examiner* — Ashish K Varma
(74) *Attorney, Agent, or Firm* — Conley Rose, P.C.; Rodney B. Carroll

(57) ABSTRACT

Surfactant compositions and methods for hydrocarbon recovery from a subterranean formation are provided. In some embodiments, the methods include: introducing a surfactant composition comprising an aqueous phase, an oil phase, an organic solvent, and one or more surfactants into a wellbore penetrating at least a portion of a subterranean formation; introducing an organic compound comprising a phosphonoalkyl moiety into the wellbore; and at least partially displacing a hydrocarbon from the subterranean formation by contacting a surface in the subterranean formation with the surfactant composition or the organic compound. In some embodiments, the compositions include: an aqueous phase; an oil phase comprising at least one solvent; an organic solvent; one or more surfactants; and at least one organic compound comprising a phosphonoalkyl moiety.

20 Claims, 3 Drawing Sheets

(58) Field of Classification Search
USPC .................................................... 166/305.1
See application file for complete search history.

(56) References Cited

U.S. PATENT DOCUMENTS

| | | | | |
|---|---|---|---|---|
| 2002/0125010 A1* | 9/2002 | Collins | ............... | C09K 8/36 |
| | | | | 166/279 |
| 2010/0006286 A1* | 1/2010 | Oliveira | ............. | C09K 8/584 |
| | | | | 166/270.1 |
| 2013/0023449 A1 | 1/2013 | Heath et al. | | |
| 2016/0075934 A1* | 3/2016 | Champagne | ............ | C09K 8/74 |
| | | | | 507/260 |
| 2018/0127640 A1* | 5/2018 | Nguyen | ............... | C09K 8/80 |

OTHER PUBLICATIONS

Howard, Paul R., et al. "Comparison of flowback aids: understanding their capillary pressure and wetting properties." SPE Production & Operations 25.03 (2010): 376-387.

Chen, Peila, and Kishore K. Mohanty. "Wettability alteration in high temperature carbonate reservoirs." SPE Improved Oil Recovery Symposium. Society of Petroleum Engineers, 2014.

International Preliminary Report on Patentability issued in related PCT Application No. PCT/US2018/060617 dated May 27, 2021, 7 pages.

\* cited by examiner

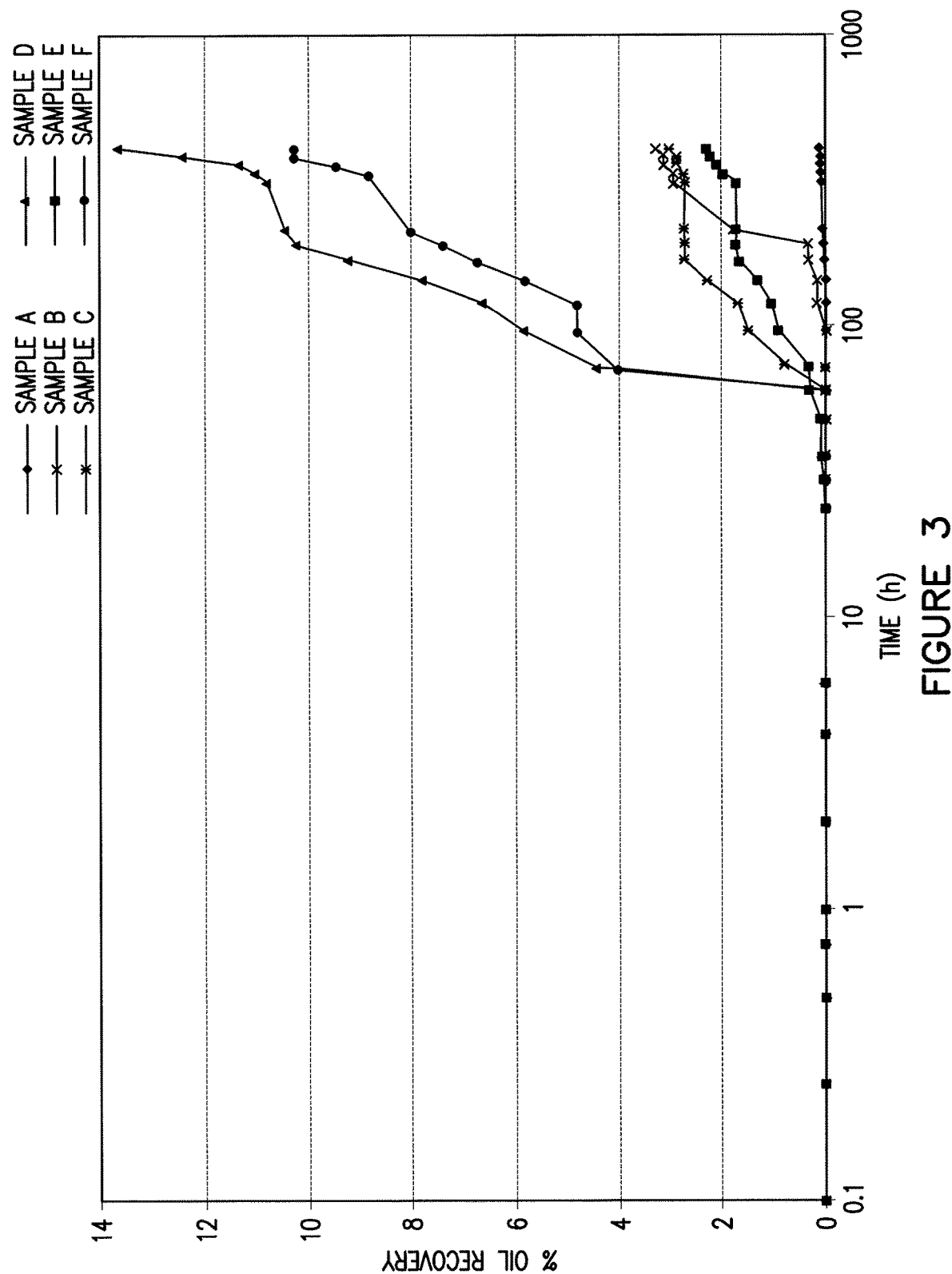

METHODS AND COMPOSITIONS FOR HYDROCARBON RECOVERY

CROSS-REFERENCE TO RELATED APPLICATION

The present application is a U.S. National Stage Application of International Application No. PCT/US2018/060617 filed Nov. 13, 2018, which is incorporated herein by reference in its entirety for all purposes.

BACKGROUND

The present disclosure relates to compositions and methods for treating a subterranean formation.

Treatment fluids may be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations may include, for example, fracturing operations, gravel packing operations, acidizing operations, scale dissolution and removal, consolidation operations, workover operations, enhance oil recovery operations, and the like. For example, a fluid may be used to drill a wellbore in a subterranean formation or to complete a wellbore in a subterranean formation, as well as numerous other purposes.

During certain subterranean formation operations (e.g., stimulation operations, such as hydraulic fracturing), the treatment fluid itself may remain trapped in the pore spaces of the subterranean formation, thereby reducing or prohibiting production of the hydrocarbons. Chemical blends formulated as flowback aids may be used to recover trapped hydrocarbons and introduced treatment fluids from subterranean formations. Such flowback aids may be used to reduce damage to a formation due to imbibed fluids in the formation and propped fractures, increase permeability of a formation and effective flow area, enhance recovery of produced hydrocarbons, and the like. Surfactants may be used as flowback aids to increase the drainage speed (i.e., de-watering) of introduced hydrocarbons and/or treatment fluids from a formation. Surfactants (alone or in combination with other compounds or chemicals) may be used to demulsify various emulsions (e.g., oil-in-water or water-in-oil emulsions) to separate hydrocarbons from the aqueous phase of an emulsion. Demulsification may be important, for example during stimulation (e.g., hydraulic fracturing) operations, because the presence of emulsions may increase the viscosity of fracturing fluids or produced fluids, decreasing the effective permeability thereof, and thus have a negative impact on overall production.

BRIEF DESCRIPTION OF THE DRAWINGS

These drawings illustrate certain aspects of some of the embodiments of the present disclosure and should not be used to limit or define the claims.

FIG. 3 is a graph illustrating data from oil recovery tests performed using compositions in accordance with certain embodiments of the present disclosure.

Figure 1:
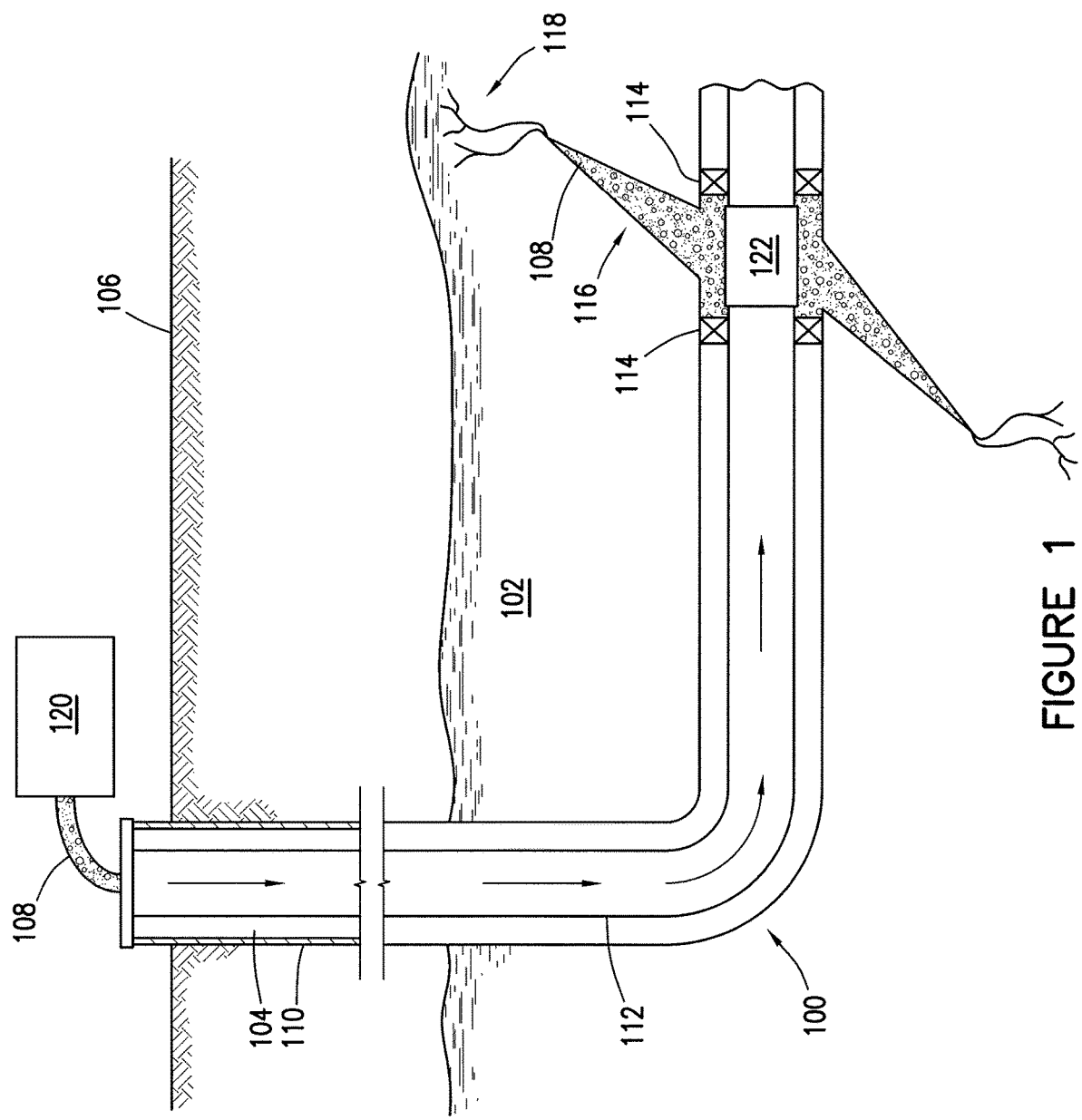
FIG. 1 is a diagram illustrating an example of a subterranean formation in which a fracturing operation may be performed in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to compositions and methods for treating a subterranean formation. More particularly, the present disclosure relates to surfactant compositions and methods for hydrocarbon recovery from a subterranean formation.

The present disclosure provides treatment fluids comprising a base fluid and a surfactant composition. In certain embodiments, the surfactant composition may comprise a microemulsion. As used herein, the term "microemulsion" refers to a mixture of at least three components, including an aqueous phase, an oil phase, and at least one surfactant, the mixture of which may be thermodynamically stable. In certain embodiments, the surfactant composition comprises an aqueous phase, an oil phase, an organic solvent, and one or more surfactants. In certain embodiments, the base fluid, the surfactant composition, or both comprise one or more organic compounds comprising a phosphonoalkyl moiety.

The present disclosure also provides methods of treating a subterranean formation using the treatment fluids of the present disclose. In certain embodiments, the methods of the present disclosure comprise introducing a surfactant composition and one or more organic compounds comprising a phosphonoalkyl moiety into a wellbore penetrating at least a portion of the subterranean formation. In such embodiments, the one or more organic compounds comprising a phosphonoalkyl moiety may be in the base fluid, the surfactant composition, or both. In certain embodiments, the surfactant composition and the organic compounds comprising a phosphonoalkyl moiety may be added to a treatment fluid comprising an aqueous base fluid before being introduced into the wellbore. In some embodiments, the methods of the present disclosure may further comprise at least partially displacing a hydrocarbon from the subterranean formation by contacting a surface in the subterranean formation with the surfactant composition and/or the organic compound comprising phosphonoalkyl moiety.

Among the many potential advantages to the methods and compositions of the present disclosure, only some of which are alluded to herein, the methods and compositions of the present disclosure may decrease capillary pressure within a subterranean formation, reduce interfacial tension between oil and water, alter wettability of at least a portion of the subterranean formation, or a combination thereof, thereby enhancing flowback of hydrocarbons from the subterranean formation, particularly in oil-wet formations. The methods and compositions of the present disclose also may provide increased flowback of produced materials as compared to other compositions without an organic compound comprising a phosphonoalkyl moiety. The methods and compositions of the present disclose further may allow surfactants to may penetrate deeper into portions of a subterranean formation in which it is introduced (e.g., fractures) than other non-emulsified surfactants compositions, which may in turn increase flowback of materials produced from the formation. The methods and compositions of the present disclosure additionally may alter the viscosity of hydrocarbons within the subterranean formation thereby enhancing the permeability of the hydrocarbons and improving flowback of the hydrocarbons.

Furthermore, in certain embodiments, the surfactant compositions of the present disclosure may include one or more demulsifying surfactants. In such embodiments, the surfactant composition may reduce or eliminate emulsions in fluids produced from a subterranean formation after performing one or more subterranean operations, such stimulation operations, thereby providing demulsification and permeability of produced fluids which in turn may aid in the flowback of the produced fluids from the subterranean formation.

The surfactant compositions of the present disclose may include water, e.g., an aqueous phase. The water may be any suitable proportion of the surfactant composition as will be appreciated by one of skill in the art with the benefit of this disclosure. In certain embodiments, the water may be present in the surfactant composition in an amount from about 0.01 wt. % to about 99.99 wt. % by volume of the surfactant composition. In other embodiments, the water may be present in the surfactant composition in an amount from about 10 wt. % to about 80 wt. %. In other embodiments, the water may be present in the surfactant composition in an amount from about 20 wt. % to about 70 wt. %. In other embodiments, the water may be present in the surfactant composition in an amount from about 0.01 wt. % or less to about 0.1 wt. %, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9 wt. %, or about 99.99 wt. % or more by volume of the surfactant composition. The water may be any suitable water, such as fresh water, de-ionized water, salt water, brine, produced water, flowback water, brackish water, or sea water.

In certain embodiments, the water may be a salt water or brine. In such embodiments, the salt may be any suitable salt, such as at least one of NaBr, $CaCl_2$, $CaBr_2$, $ZnBr_2$, KCl, NaCl, a carbonate salt, a sulfonate salt, sulfite salts, sulfide salts, a phosphate salt, a phosphonate salt, a magnesium salt, a bromide salt, a formate salt, an acetate salt, and a nitrate salt. In certain embodiments, the water may have any suitable total dissolved solids level, as will be appreciated by one of skill in the art with the benefit of this disclosure, such as about 1,000 mg/L to about 250,000 mg/L, or about 1,000 mg/L or less, or about 5,000 mg/L, 10,000, 15,000, 20,000, 25,000, 30,000, 40,000, 50,000, 75,000, 100,000, 125,000, 150,000, 175,000, 200,000, 225,000, or about 250,000 mg/L or more. In certain embodiments, the water may have any suitable salt concentration, as will be appreciated by one of skill in the art with the benefit of this disclosure, such as about 1,000 ppm to about 300,000 ppm, or about 1,000 ppm to about 150,000 ppm, or about 1,000 ppm or less, or about 5,000 ppm, 10,000, 15,000, 20,000, 25,000, 30,000, 40,000, 50,000, 75,000, 100,000, 125,000, 150,000, 175,000, 200,000, 225,000, 250,000, 275,000, or about 300,000 ppm or more. In certain embodiments, the water may have a concentration of at least one salt from about 0.1 wt. % to about 20 wt. % by volume of the water. In other embodiments, the water may have a concentration of at least one salt from about 0.1 wt. %, or less, to about 0.5% w/v, 1, 2, 3, 4, 5, 6, 7, 8, 9, 10, 11, 12, 13, 14, 15, 16, 17, 18, 19, 20, 21, 22, 23, 24, 25, 26, 27, 28, 29, or about 30% by volume of the water. In various embodiments, the surfactant composition may be an emulsion that is stable under conditions of high salinity in the aqueous phase of the emulsion, such as any level of salinity described herein.

The surfactant composition may include an oil, e.g., an oil phase. The oil may include one or more oil components. The oil may form any suitable proportion of the surfactant composition as will be appreciated by one of skill in the art with the benefit of this disclosure. In certain embodiments, the oil may be present in the surfactant composition in an amount from about 0.01 wt. % to about 99.99 wt. % by volume of the surfactant composition. In other embodiments, the oil may be present in the surfactant composition in an amount from about 10 wt. % to about 80 wt. % by volume of the surfactant composition. In other embodiments, the oil may be present in the surfactant composition in an amount from about 20 wt. % to about 70 wt. % by volume of the surfactant composition. In other embodiments, the oil may be present in the surfactant composition in an amount from about 0.01 wt. % or less to about 0.1 wt. %, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9 wt. %, or about 99.99 wt. % or more by volume of the surfactant composition.

In certain embodiments, the oil phase may include or may be petroleum distillates, having any suitable boiling point range, such as light petroleum distillates (e.g., having a boiling point range between about 100° C. and about 300° C. or greater than about 200° C. and less than about 250° C.). In certain embodiments, the oil phase may include a ($C_5$ to $C_{50}$)hydrocarbon, a terpene, d-limonene, a dipentene, a pinene, a terpene obtained from the essence of oranges, ethyl lactate, an oil of turpentine, isobutyl alcohol, linear or branched distillates (e.g., $C_8$ to $C_{26}$), methyl 9-decenoate, 1-dodecyl-2-pyrrolidinone, dimethyl 2-methylglutarate, an ethoxylated propoxylated terpene, N,N-dimethyl 9-decenamide, triethyl citrate, diethyl carbonate, n-methylpyrrolidone, an isoprene adduct, an isomer of an isoprene adduct (e.g., a $C_5$ to $C_{15}$ isomer, such as a $C_{10}$ isomer), a ($C_5$ to $C_{50}$) alkane, a ($C_5$ to $C_{50}$)isoalkane, a ($C_5$ to $C_{50}$) alkene, a silicone oil, a ($C_1$ to $C_5$) alkyl ester of a substituted or unsubstituted ($C_1$ to $C_{20}$)carboxylic acid, or any combinations thereof. In certain embodiments, the oil phase may comprise methyl 9-decenoate, 1-dodecyl-2-pyrrolidinone, dimethyl 2-methylglutarate, N,N-dimethyl 9-decenamide, n-methylpyrrolidone, dimethyl glutarate, dimethyl succinate, dimethyl adipate, and any combination thereof. In certain embodiments, the oil phase may comprise a blend of methyl 9-decenoate and N,N-dimethyl 9-decenamide. In certain embodiments, the oil phase may comprise a blend of dimethyl 2-methylglutarate, an exothylated propoxylated terpene, and polyethylene glycol. In certain embodiments, the oil phase may be or may include hydrotreated petroleum distillate (e.g., dearomatized petroleum distillates). In certain embodiments, the oil phase may be hydrotreated light petroleum distillates having a boiling point range greater than about 200° C. and less than about 250° C.

In certain embodiments, the surfactant composition may include both an aqueous phase and an oil phase, as described above. In some embodiments, the aqueous phase and the oil phase may be separate in the surfactant composition (e.g., not mixed). In other embodiments, the aqueous phase and the oil phase may be combined in the surfactant composition as an emulsion of the aqueous phase and the oil phase. In such embodiments, the emulsion may be any suitable emulsion. In some embodiments, the aqueous phase is the outer phase and the oil phase is the inner phase. In other embodiments, the oil phase is the outer phase and the aqueous phase is the inner phase.

The size (e.g., the largest dimension) of the droplets of the inner phase of the emulsion within the outer phase of the emulsion may be any suitable size as will be appreciated by one of skill in the art with the benefit of this disclosure. In certain embodiments, the size of the droplets may be from about 0.001 micron to about 5 mm. In other embodiments, the size of the droplets may be from about 1 micron to about 1,000 microns. In other embodiments, the size of the droplets may be from about 0.005 microns to about 100 microns. In other embodiments, the size of the droplets may be from about 0.005 microns to about 0.3 microns. In other embodiments, the size of the droplets may be from about 0.01 microns to about 0.15 microns. In other embodiments, the size of the droplets may be from about 0.001 microns, or less, to about 0.005 microns, 0.01, 0.02, 0.03, 0.04, 0.05, 0.06, 0.07, 0.08, 0.09, 0.1, 0.1 1, 0.12, 0.13, 0.14, 0.15, 0.16, 0.17, 0.18, 0.19, 0.2, 0.25, 0.3, 0.35, 0.4, 0.45, 0.5, 1, 2, 3, 4, 5, 6, 8, 10, 15, 20, 25, 50, 75, 100, 125, 150, 175, 200, 250, 300, 350, 400, 450, 500, 600, 700, 800, 900 microns, 1 mm, 2, 3, 4 mm, or about 5 mm. In certain embodiments, the emulsion may be a microemulsion, with a size of the droplets of the inner phase of the emulsion within the outer phase of the emulsion being from about 0.001 microns to about 1,000 microns, from about 1 micron to about 1,000 microns, or from about 1 micron to about 100 microns.

In certain embodiments, the surfactant composition may include one or more organic solvents. The one or more organic solvents may be any suitable proportion of the surfactant composition as will be appreciated by one of skill in the art with the benefit of this disclosure. In certain embodiments, the organic solvent may be present in the surfactant composition in an amount from about 0.01 wt. % to about 99.99 wt. % by volume of the surfactant composition. In other embodiments, the organic solvent may be present in the surfactant composition in an amount from about 5 wt. % to about 40 wt. % by volume of the surfactant composition. In other embodiments, the organic solvent may be present in the surfactant composition in an amount from about 20 wt. % to about 40 wt. % by volume of the surfactant composition. In other embodiments, the organic solvent may be present in the surfactant composition in an amount from about 0.01 wt. %, or less, to about 0.1 wt. %, 1, 2, 3, 4, 5, 6, 7, 8, 9, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9 wt. %, or about 99.99 wt. % by volume of the surfactant composition.

In certain embodiments, the organic solvent may be any organic solvent that is at least partially miscible with water. In some embodiments, the organic solvent is substantially in the aqueous phase of the surfactant composition. In certain embodiments, the organic solvent may be ethanol, isopropanol, n-propanol, n-butanol, s-butanol, t-butanol, n-pentanol, a pentanol isomer, or a combination thereof. In certain embodiments, the organic solvent may be a substituted or unsubstituted ($C_1$ to $C_{20}$)hydrocarbyl alcohol. In some embodiments, the organic solvent may be a ($C_1$ to $C_5$) alkyl alcohol. In certain embodiments, the organic solvent may lower the freeze point or pour point of the surfactant composition.

As used herein in connection with an organic molecule, compound, or group, the term "substituted" refers to the state in which one or more hydrogen atoms contained therein are replaced by one or more non-hydrogen atoms. As used herein, the terms "hydrocarbon," "hydrocarbyl," and "hydrocarbylene" refer to a molecule or functional group, respectively, that includes at least carbon and hydrogen atoms. A hydrocarbyl group may be a derived from a straight, branched, or cyclic hydrocarbon and may be an alkyl, an alkenyl, an alkynyl, an aryl, a cycloalkyl, an acyl, or any combination thereof. A hydrocarbylene group may be a derived from a straight, branched, or cyclic hydrocarbon and is an alkenyl (i.e., contains at least one carbon-to-carbon double bond). Unless otherwise specified, as used herein, hydrocarbyl and hydrocarbylene groups may be branched or unbranched and substituted or unsubstituted.

Hydrocarbons, hydrocarbyl, and hydrocarbylene are referred to herein using ($C_a$ to $C_b$), wherein a and b are positive integers that designate a range of the number of carbon atoms that the hydrocarbon, hydrocarbyl group, or hydrocarbylene group may contain. The range ($C_a$ to $C_b$) shall independent include each hydrocarbon, hydrocarbyl, or hydrocarbylene within that range as if specifically and separately listed. The lowest and highest numbers of the range (i.e., a and b), as well as in other range used herein, shall be understood to be included within the range set forth.

As used herein, the terms "alkyl" or "alkane" refer to a saturated linear or branched primary, secondary, or tertiary hydrocarbon including, but not limited to, methyl, ethyl, propyl, isopropyl, butyl, isobutyl, t-butyl, and sec-butyl. An alkyl group or alkane may be optionally substituted where possible with any moiety that does not otherwise interfere with the activity, function, or specific reactivity of the overall compound as set forth within the present disclosure, including, but not limited to, halo, haloalkyl, hydroxyl, carboxyl, acyl, aryl, acyloxy, amino, amido, carboxyl derivatives, alkylamino, dialkylamino, arylamino, alkoxy, aryloxy, nitro, cyano, sulfonic acid, sulfonyl, sulfanyl, sulfinyl, sulfamonyl, ester, carboxylic acid, thiol, imine, amide, phosphonoalkyl, phosphonyl, phosphinyl, phosphoryl, phosphine, thioester, thioether, acyl halide, anhydride, oxime, hydrazine, carbamate, phosphonic acid, phosphonate, and any combinations thereof, any of which may be protected or unprotected as necessary, as will be appreciated by those of ordinary skill in the art with the benefit of this disclosure.

As used herein, the terms "alkenyl" or "alkene" refer to a cyclic or non-cyclic, linear or branched primary, secondary, or tertiary hydrocarbon having one or more unsaturated carbon-carbon bonds including, but not limited to ethenyl, propenyl, isopropenyl, butenyl, isobutenyl, t-butenyl, and sec-butenyl. An alkenyl group or alkene may be optionally substituted where possible with any moiety that does not otherwise interfere with the activity, function, or specific reactivity of the overall compound as set forth within the present disclosure, including, but not limited to, halo, haloalkyl, hydroxyl, carboxyl, acyl, aryl, acyloxy, amino, amido, carboxyl derivatives, alkylamino, dialkylamino, arylamino, alkoxy, aryloxy, nitro, cyano, sulfonic acid, sulfonyl, sulfanyl, sulfinyl, sulfamonyl, ester, carboxylic acid, thiol, imine, amide, phosphonoalkyl, phosphonyl, phosphinyl, phosphoryl, phosphine, thioester, thioether, acyl halide, anhydride, oxime, hydrazine, carbamate, phosphonic acid, phosphonate, and any combinations thereof, any of which may be protected or unprotected as necessary, as will be appreciated by those of ordinary skill in the art with the benefit of this disclosure.

As used herein, the terms "alkynyl" or "alkyne" refer to a cyclic or non-cyclic, linear or branched primary, secondary, or tertiary hydrocarbon having one or more triple carbon-carbon bonds including, but not limited to ethynyl, propynyl, isopropynyl, butynyl, isobutynyl, t-butynyl, and sec-butynyl. An alkynyl group or alkyne may be optionally substituted where possible with any moiety that does not otherwise interfere with the activity, function, or specific reactivity of the overall compound as set forth within the present disclosure, including, but not limited to, halo, haloalkyl, hydroxyl, carboxyl, acyl, aryl, acyloxy, amino, amido, carboxyl derivatives, alkylamino, dialkylamino, arylamino, alkoxy, aryloxy, nitro, cyano, sulfonic acid, sulfonyl, sulfanyl, sulfinyl, sulfamonyl, ester, carboxylic acid, thiol, imine, amide, phosphonoalkyl, phosphonyl, phosphinyl, phosphoryl, phosphine, thioester, thioether, acyl halide, anhydride, oxime, hydrazine, carbamate, phosphonic acid, phosphonate, and any combinations thereof, any of which may be protected or unprotected as necessary, as will be appreciated by those of ordinary skill in the art with the benefit of this disclosure.

As used herein, the term "aryl" refers to a cyclic aromatic system comprising one, two, or three rings wherein such rings may be attached together in a pendant manner or may alternatively be fused. An aryl group may optionally be substituted where possible with any moiety that does not otherwise interfere with the activity, function, or specific reactivity of the overall compound as set forth within the present disclosure, including, but not limited to, alkyl, alkenyl, alkynyl, heteroaryl, heterocyclic, carbocycle, alkoxy, oxo, aryloxy, arylalkoxy, cycloalkyl, tetrazolyl, heteroaryloxy; heteroarylalkoxy, carbohydrate, amino acid, amino acid esters, amino acid amides, alditol, halogen, haloalkylthio, haloalkoxy, haloalkyl, hydroxyl, carboxyl, acyl, acyloxy, amino, aminoalkyl, aminoacyl, amido, alkylamino, dialkylamino, arylamino, nitro, cyano, thiol, imide, sulfonic acid, sulfate, sulfonate, sulfonyl, alkylsulfonyl, aminosulfonyl, alkylsulfonylamino, haloalkylsulfonyl, sulfanyl, sulfinyl, sulfamoyl, sulfonylimide carboxylic ester, carboxylic acid, amide, phosphonyl, phosphinyl, phosphoryl, thioester, thioether, oxime, hydrazine, carbamate, phosphonic acid, phosphate, phosphonate, phosphinate, ulfonamido, carboxamido, hydroxamic acid, and any combinations thereof. Adjacent groups on an "aryl" ring may combine to form a 5- to 7-membered saturated or partially unsaturated carbocyclic, aryl, heteroaryl or heterocyclic ring, which in turn may be substituted.

As used herein, the term "acyl" refers to a group of the formula —C(O)R', wherein R' is an alkyl group, an alkenyl group, an alkynyl group, an aryl group, or any combinations thereof.

As used herein, the term "amino" refers to a group of the formula NR'R", wherein R' and R" are each independently selected from a group consisting of a bond, a hydrogen atom, an alkyl group, an aryl group, or any combinations thereof (e.g., an alkaryl group or an aralkyl group), which may optionally be substituted.

In certain embodiments, the surfactant composition may include one or more surfactants. The one or more surfactants may be any suitable proportion of the surfactant composition as will be appreciated by one of skill in the art with the benefit of this disclosure. In certain embodiments, the one or more surfactants may be present in the surfactant composition in an amount from about 0.01 wt. % to about 50 wt. % by volume of the surfactant composition. In other embodiments, the one or more surfactants may be present in the surfactant composition in an amount from about 0.1 wt. % to about 40 wt. % by volume of the surfactant composition. In other embodiments, the one or more surfactants may be present in the surfactant composition in an amount from about 10 wt. % to about 40 wt. % by volume of the surfactant composition. In other embodiments, the one or more surfactants may be present in the surfactant composition in an amount from about 20 wt. % to about 30 wt. % by volume of the surfactant composition.

In certain embodiments, the one or more surfactants may be a nonionic surfactant, an anionic surfactant (e.g., a sulfonate or disulfonate), a cationic surfactant (e.g., a quaternary ammonium salt), a zwitterionic surfactant, an amphoteric surfactant, an amphiphilic surfactant, and any combination thereof. In certain embodiments, the surfactants used in the surfactant compositions of the present disclosure may include, but are not limited to, an alkanolamide surfactant, an alkoxylated alcohol surfactant (e.g., an ethoxylated alcohol surfactant), an alkylamine alkoxylate surfactant, an amine oxide surfactant, a fatty acid alkoxylate surfactant, an alkyl glycoside surfactant, or any combinations thereof. In certain embodiments, the surfactants used in the surfactant compositions of the present disclosure may be ethoxylated tall oil; ethoxylated ($C_{10}$ to $C_{18}$) fatty acid esters; ethoxylated ($C_{12}$ to $C_{18}$) alkylamines; ethoxylated diamines; dodecylsulfate salts; dodecylbenzene sulfonate salts; alkane, xylene, cumene, or toluene sulfonate salts; alkylamidopropyl betaines; alkylamidopropyl hydroxysultaines; ($C_{12}$ to $C_{16}$) alpha olefin sulfonate salts; linear or branched alkyl diphenyl oxide disulfonate salts; dialkylsulfosuccinate salts; benzyldimethylalkylammonium chloride; ($C_{10}$ to $C_{18}$) amine oxides; ($C_{12}$ to $C_{18}$) alkylamidopropyl amine oxides; or a combination thereof.

In certain embodiments, one or more surfactants used in the surfactant compositions of the present disclosure may be an alkanolamide surfactant. The alkanolamide surfactant may have the following structure:

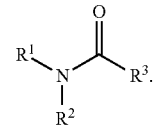

$R^1$ and $R^2$ may each be independently selected from the group consisting of a hydrogen atom (—H), a ($C_1$ to $C_5$) alkyl, a ($C_1$ to $C_{50}$)hydrocarbyl, —($CH_2$—$CH_2$—O)$_n$—H, —($CH_2$—$CH_2$—$CH_2$—O)$_n$—H, a ($C_2$ to $C_{50}$)hydrocarbylene-OH, and a ($C_2$ to $C_5$) alkylene-OH wherein "n" may be any integer from 1 to about 50. $R^3$ may be a ($C_1$ to $C_{50}$)hydrocarbyl. In certain embodiments, $R^3$ may be a substituted or unsubstituted ($C_5$ to $C_{25}$)hydrocarbyl. In other embodiments, $R^3$ may be a substituted or unsubstituted ($C_9$ to $C_{19}$)hydrocarbyl.

In certain embodiments, the alkanolamide surfactant may be an alkanolamide of a tall oil fatty acid, a coconut oil fatty acid, or a tallow fatty acid having the structure $R^3$—C(O)—OH (e.g., the alkanolamide surfactant can have a structure identical to an another alkanolamide that is actually derived from the corresponding fatty acid, but the alkanolamide surfactant need not be actually derived from the corresponding fatty acid). "C(O)—OH" is used interchangeably with "carboxyl group" herein. In such embodiments, the alkanolamide may be ethoxylated such that at least one of $R^1$ and $R^2$ may be —($CH_2$—$CH_2$—O)$_n$—H, wherein "n" may be an integer from 1 to about 50. In one embodiment, $R^1$ and $R^2$ may each be —$CH_2$—$CH_2$—OH (where n is 1) and $R^3$ may be a ($C_9$ to $C_{19}$)hydrocarbyl of a coconut oil fatty acid.

In certain embodiments, one or more surfactants used in the surfactant compositions of the present disclosure may be an alkoxylated alcohol surfactant. The alkoxylated alcohol surfactant may have the following structure:

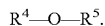

$R^4$ may be a substituted or unsubstituted ($C_1$ to $C_{50}$)hydrocarbyl. In certain embodiments, $R^4$ may be a substituted or unsubstituted ($C_{10}$ to $C_{20}$)hydrocarbyl. In other embodiments, $R^4$ may be a substituted or unsubstituted ($C_6$ to $C_{16}$)hydrocarbyl. $R^5$ may be selected from the group consisting of —($CH_2$—$CH_2$—O)$_m$—H and —($CH_2$—$CH_2$—$CH_2$—O)$_m$—H, where m is an integer from 1 to about 20. In certain embodiments, $R^4$ and $R^5$ each may be a primary alcohol. In other embodiments, at least one of $R^4$ and $R^5$ may be a secondary alcohol such that the oxygen atom is bonded to $R^4$ or $R^5$, or both, at a carbon atom having two other carbon atoms bonded thereto.

In certain embodiments, the alkoxylated alcohol surfactant can include or can be ethoxylated branched or linear ($C_{12}$ to $C_{16}$) alcohols, alkylphenol ethoxylates (APEs), ($C_8$ to $C_{16}$) alkylpolyglucoside (APGs), tristyrylphenol ethoxylates, ethylene oxide-propylene oxide surfactants (e.g., Pluronic® type surfactants), or any combination thereof.

In certain embodiments, one or more surfactants used in the surfactant compositions of the present disclosure may be an alkylamine alkoxylate surfactant. The alkylamine alkoxylate surfactant may have the following structure:

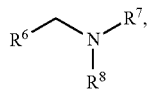

or a salt thereof. $R^6$ may be a substituted or unsubstituted ($C_1$ to $C_{50}$)hydrocarbyl of a fatty acid having chemical the structure $R^6$—C(O)—OH. In certain embodiments, $R^6$ may be a substituted or unsubstituted ($C_9$ to $C_{19}$)hydrocarbyl of a coconut oil fatty acid. $R^7$ and $R^8$ may each be independently selected from the group consisting of a hydrogen atom (—H) and —($CH_2$—$CH_2$—O)$_p$—H, where p is an integer from 1 to about 30.

In certain embodiments, one or more surfactants used in the surfactant compositions of the present disclosure may be a fatty acid alkoxylate surfactant. The fatty acid alkoxylate surfactant may have the following structure:

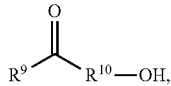

or a salt thereof. $R^9$ may be a substituted or unsubstituted ($C_5$ to $C_{20}$)hydrocarbyl of a fatty acid having the structure $R^9$—C(O)—OH. $R^{10}$ may be selected from the group consisting of —(O—$CH_2$—$CH_2$)$_q$ and —(O—$CH_2$—$CH_2$—$CH_2$)$_q$, where q is an integer from 1 to about 50.

In certain embodiments, one or more surfactants used in the surfactant compositions of the present disclosure may be an alkyl glycoside surfactant. The alkyl glycoside surfactant may have one of the following structures:

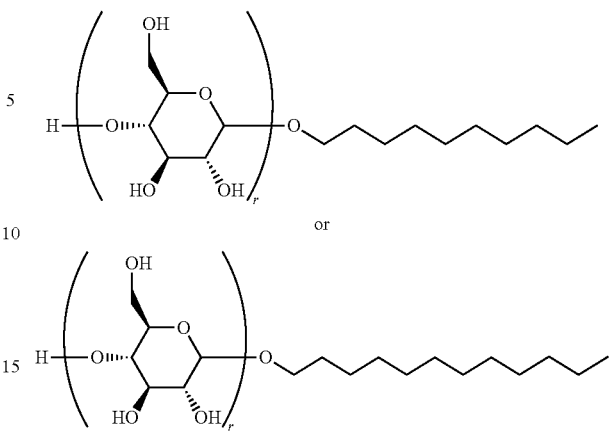

where r may be an integer from 1 to about 100.

In certain embodiments, one or more surfactants used in the surfactant compositions of the present disclosure may be an amine oxide surfactant. In certain embodiments, the amine oxide surfactant may have the following structure:

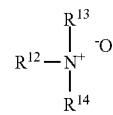

In such embodiments, $R^{12}$ may be selected from the group consisting of a substituted or unsubstituted ($C_1$ to $C_{50}$) hydrocarbyl. $R^{13}$ and $R^{14}$ may each independently be a substituted or unsubstituted ($C_1$ to $C_{20}$)hydrocarbyl.

In certain embodiments, the amine oxide surfactant may have one of the following structures:

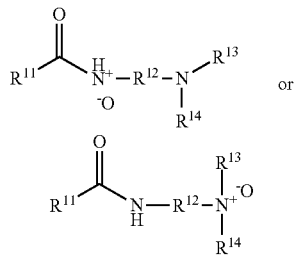

In such embodiments, $R^{12}$ may be selected from the group consisting of a substituted or unsubstituted ($C_1$ to $C_{20}$) hydrocarbyl and a substituted or unsubstituted ($C_1$ to $C_{20}$) hydrocarbylene. In certain embodiments, $R^{12}$ may be a substituted or unsubstituted ($C_1$ to $C_5$)hydrocarbylene, such a propylene. $R^{13}$ and $R^{14}$ may each independently be a substituted or unsubstituted ($C_1$ to $C_{20}$)hydrocarbyl. In certain embodiments, $R^{13}$ and $R^{14}$ may each independently be a substituted or unsubstituted ($C_1$ to $C_5$)hydrocarbyl. In certain embodiments, both $R^{13}$ and $R^{14}$ may each be a methyl group. $R^{11}$ may be a substituted or unsubstituted ($C_1$ to $C_{50}$)hydrocarbyl. In certain embodiments, $R^{11}$ may be a substituted or unsubstituted ($C_5$ to $C_{30}$)hydrocarbyl. In other embodiments, $R^{11}$ may be a substituted or unsubstituted ($C_5$ to $C_{20}$)hydrocarbyl. In other embodiments, $R^{11}$ may be a substituted or unsubstituted ($C_{11}$ to $C_{13}$)hydrocarbyl.

In certain embodiments, one or more surfactants used in the surfactant compositions of the present disclosure may be a polyamine polyether surfactant. In certain embodiments, the polyamine polyether surfactant may have the following structure:

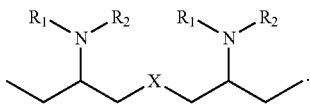

In such embodiments, $R_1$ and $R_2$ each may be independent selected from the group consisting of: an alkyl, an alkenyl, a vinyl, an allyl, an alkynyl, an aryl, a phenyl, a benzyl, and a proparyl. In such embodiments, X may be an oxyalkoxo group having the following structure:

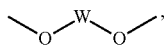

in which W may be a ($C_1$ to $C_5$) alkylene, 2-methyl propylene, 2,2-dimethyl propylene, or have one of the following structures:

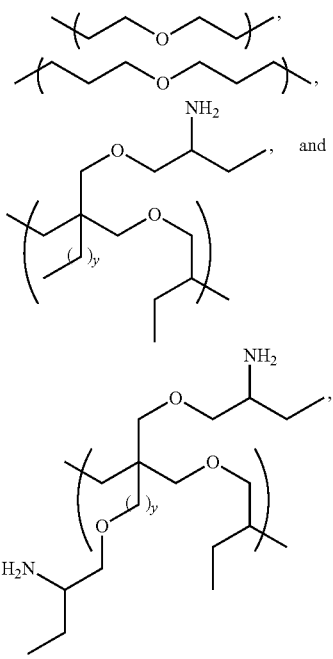

wherein y is an integer representing from about 0 to about 6 methylene units.

In certain embodiments, the polyamine polyether surfactant may have the following structure:

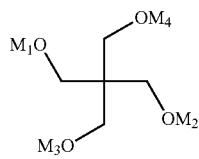

wherein $M_1$, $M_2$, $M_3$, and $M_4$ each have the following structure:

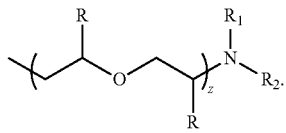

In such embodiments, R may be selected from the group consisting of: methyl, ethyl, and propyl. $R_1$ and $R_2$ each may be independent selected from the group consisting of: an alkyl, an alkenyl, a vinyl, an allyl, an alkynyl, an aryl, a phenyl, a benzyl, and a proparyl. The variable "z" may be an integer from about 1 to about 25. In such embodiments, R, $R_1$, and $R_2$ may be the same or different across $M_1$, $M_2$, $M_3$, and $M_4$. For example, in certain embodiments, M1 may be identical to one or more of $M_2$, $M_3$, $M_4$, and, in certain embodiments, $M_1$ may be different than at least one of $M_2$, $M_3$, and $M_4$.

The treatment fluids of the present disclosure may include any aqueous base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may include water from any source. Such aqueous fluids may include fresh water, salt water (e.g., water containing one or more salts dissolved therein), brine (e.g., saturated salt water), seawater, or any combination thereof. In certain embodiments of the present disclosure, the aqueous fluids include one or more ionic species, such as those formed by salts dissolved in water. For example, seawater and/or produced water may include a variety of divalent cationic species dissolved therein. In certain embodiments, the one or more ionic species may be selected from the group consisting of: H, Li, Na, K, Cs, Be, Mg, Ca, Sr, Ba, Cr, Fe, Mn, Co, Ni, Cu, Ga, In, $NH_4$, and any combination thereof. In certain embodiments, the density of the aqueous fluid may be adjusted, among other purposes, to provide additional particulate transport and suspension in the compositions of the present disclosure. In certain embodiments, the treatment fluids may include a mixture of one or more aqueous fluids with other fluids and/or gases, including but not limited to emulsions, foams, and the like.

In certain embodiments, the surfactant compositions and/or the treatment fluids of the present disclosure may include one or more organic compounds comprising a phosphonoalkyl moiety. Suitable organic compounds comprising a phosphonoalkyl moiety include, but are not limited to, n-(phosphonoalkyl) iminodiacetic acids (PIMDA), or salts thereof, N-(carboxymethyl)-N-(phosphonomethyl)glycine, glycine, N,N'-1,2-ethanediylbis(N-(phosphonomethyl), glyphosine; aminotrimethylene phosphonic acid, sodium aminotris(methylenephosphonate), N-(2-hydroxyethyl)iminobis(methylphosphonic acid), phosphonic acid, P,P'-((2-propen-1-ylimino)bis(methylene))bis-; phosphonic acid, P,P',P'''-(nitrilotris(methylene))tris-; (nitrilotris(methylene))trisphosphonic acid; ((methylimino)-dimethylene)bisphosphonic acid; phosphonic acid, P,P',P''',P''''-(oxybis(2,1-ethanediylnitrilobis-(methylene))tetrakis-; ((propylimino)bis(methylene))diphosphonic acid; phosphonic acid, P,P',P'''-(nitrilotris (methylene))tris-; (ethylenedinitrilo)-tetramethylenephosphonic acid; ethylene-bis (nitrilodimethylene)tetraphosphonic acid; (ethylenebis (nitrilobis(methylene)))tetrakisphosphonic acid; tetrasodium tetrahydrogen (ethane-1,2-diylbis(nitrilobis (methylene)))tetrakisphosphonate; 6-(bis(phosphonomethyl) amino)hexanoic acid; (phenylmethyl)imino)bis-(methylene)bisphosphonic acid; a sodium, potassium, or ammonium salt of any group member herein, and mixtures thereof; group of phosphonobutane tricarboxylic acid, 2-hydroxyphosphono dicarboxylic acid, and any combination thereof.

In certain embodiments, the organic compound comprising a phosphonoalkyl moiety have the following structure:

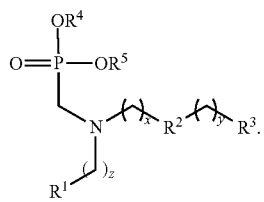

$R^1$ may be selected from the group consisting of: a ($C_1$ to $C_{10}$) alkyl, a ($C_1$ to $C_{10}$) alkenyl, a ($C_1$ to $C_{10}$) alkynl, an acyl, an aryl, acetate, a carboxyl, a hydrogen atom, and a phosphonate. $R^2$ may be selected from the group consisting of: a ($C_1$ to $C_6$) alkyl, a ($C_1$ to $C_{10}$) alkenyl, a ($C_1$ to $C_{10}$) alkynl, an acyl, an aryl, acetate, a carbonyl, a hydrogen atom, a phosphonate, or a phosphonoalkylamine. $R^3$ may be selected from the group consisting of: a ($C_1$ to $C_{10}$) alkyl, a ($C_1$ to $C_{10}$) alkenyl, a ($C_1$ to $C_{10}$) alkynl, an acyl, an aryl, acetate, a hydrogen atom, and a phosphonoalkylamine. $R^4$ and $R^5$ each may be independently selected from the group consisting of: a ($C_1$ to $C_{10}$) alkyl, a ($C_1$ to $C_{10}$) alkenyl, a ($C_1$ to $C_{10}$) alkynl, an acyl, an aryl, acetate, H, Li, Na, K, Cs, Be, Mg, Ca, Sr, Ba, Cr, Fe, Mn, Co, Ni, Cu, Ga, In, $NH_4$, or a phosphonoalkylamine. In certain embodiments, "x" may be an integer in the range from about 1 to about 6. In certain embodiments, "y" may be an integer in the range from about 0 to about 6. In certain embodiments, "z" may be an integer in the range from about 0 to about 6.

In certain embodiments, the organic compound comprising a phosphonoalkyl moiety have the following structure:

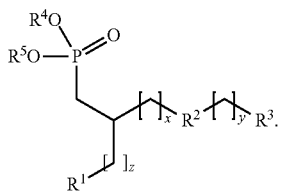

$R^1$ may be selected from the group consisting of: a ($C_1$ to $C_{10}$) alkyl, a ($C_1$ to $C_{10}$) alkenyl, a ($C_1$ to $C_{10}$) alkynl, an acyl, an aryl, acetate, a carboxyl, a hydrogen atom, and a phosphonate. $R^2$ may be selected from the group consisting of: a ($C_1$ to $C_6$) alkyl, a ($C_1$ to $C_{10}$) alkenyl, a ($C_1$ to $C_{10}$) alkynl, an acyl, an aryl, acetate, a carbonyl, a hydrogen atom, a phosphonate, or a phosphonoalkylamine. $R^3$ may be selected from the group consisting of: a ($C_1$ to $C_{10}$) alkyl, a ($C_1$ to $C_{10}$) alkenyl, a ($C_1$ to $C_{10}$) alkynl, an acyl, an aryl, acetate, a hydrogen atom, and a phosphonoalkylamine. $R^4$ and $R^5$ each may be independently selected from the group consisting of: a ($C_1$ to $C_{10}$) alkyl, a ($C_1$ to $C_{10}$) alkenyl, a ($C_1$ to $C_{10}$) alkynl, an acyl, an aryl, acetate, H, Li, Na, K, Cs, Be, Mg, Ca, Sr, Ba, Cr, Fe, Mn, Co, Ni, Cu, Ga, In, $NH_4$, or a phosphonoalkylamine. In certain embodiments, "x" may be an integer in the range from about 1 to about 6. In certain embodiments, "y" may be an integer in the range from about 0 to about 6. In certain embodiments, "z" may be an integer in the range from about 0 to about 6.

In certain embodiments, the organic compound comprising a phosphonoalkyl moiety may comprise a metallated diacetoaminophosphonate. As used herein, the term "metallated" refers to the conjugate base form of the species where the metal is one of Group 1, 2, 3 or a divalent, trivalent or quadrivalent cationic or positively charged ionic species. In certain embodiments, the organic compound comprising a phosphonoalkyl moiety may comprise a N-(phosphonoalkyl)iminodiacetic acid salt. In certain embodiments, the organic compound comprising a phosphonoalkyl moiety may comprise a N-(phosphonomethyl)iminodiacetic acid (or "PMIDA") salt having the following structure:

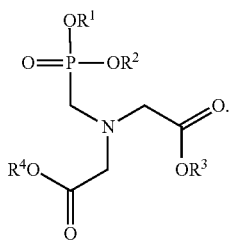

$R^1$, $R^2$, $R^3$, and $R^4$ each may be independently selected from the group consisting of: H, Li, Na, K, Cs, Be, Mg, Ca, Sr, Ba, Cr, Fe, Mn, Co, Ni, Cu, Ga, In, $NH_4$, and any combination thereof.

In certain embodiments, one or more organic compounds comprising a phosphonoalkyl moiety may be added to treatment fluid separately from the surfactant composition. In such embodiments, the treatment fluid may comprise the organic compound comprising a phosphonoalkyl moiety in an amount from about 0.005 wt. % to about 60 wt. % by volume of the base fluid in the treatment fluid. In certain embodiments, the treatment fluid may comprise one or more surfactant compositions of the present disclosure in an amount from about 0.01 wt. % to about 40 wt. % by volume of the base fluid. In other embodiments, the treatment fluid may comprise one or more surfactant compositions of the present disclosure in an amount from about 0.05 wt. % to about 20 wt. % by volume of the base fluid. In other embodiments, the treatment fluid may comprise one or more surfactant compositions of the present disclosure in an amount from about 0.05 wt. % to about 5 wt. % by volume of the base fluid.

In other embodiments, the organic compounds comprising a phosphonoalkyl moiety may be added to the aqueous phase of the surfactant composition, and the surfactant composition may in turn be added to the treatment fluid. In such embodiments, the aqueous phase of the surfactant composition may comprise the organic compound comprising a phosphonoalkyl moiety in an amount from about 0.005 wt. % to about 10 wt. % by volume of the aqueous phase. In certain embodiments, the aqueous phase of the surfactant compositions may comprise one or more surfactant composition of the present disclosure in an amount from about 0.01 wt. % to about 5 wt. % by volume of the aqueous phase. In other embodiments, the aqueous phase of the surfactant compositions may comprise one or more surfactant compositions of the present disclosure in an amount from about 0.05 wt. % to about 2 wt. % by volume of the aqueous phase.

In certain embodiments, the treatment fluids of the present disclosure may comprise one or more surfactant compositions of the present disclosure in an amount from about 0.005 wt. % to about 5 wt. % by volume of the base fluid. In other embodiments, the treatment fluids may comprise one or more surfactant compositions of the present disclosure in an amount from about 0.005 wt. % to about 1 wt. % by volume of the base fluid. In other embodiments, the treatment fluids may comprise one or more surfactant compositions of the present disclosure in an amount from about 0.1 wt. % to about 0.2 wt. % by volume of the base fluid. These weight percentages of the surfactant composition by volume of the base fluid of the treatment fluid are applicable regardless of whether the organic compound comprising a phosphonoalkyl moiety is added to the treatment fluid or the aqueous phase of the surfactant composition.

In certain embodiments, the pH of the base fluid and/or the aqueous phase of the surfactant composition may be adjusted (e.g., by a buffer or other pH adjusting agent) to a specific level that is sufficient to deprotonate the organic compound comprising a phosphonoalkyl moiety. In certain embodiments, the pH of the base fluid and/or the aqueous phase of the surfactant composition may be from about 4 to about 11. In other embodiments, the pH of the base fluid and/or the aqueous phase of the surfactant composition may be from about 5 to about 9. In other embodiments, the pH of the base fluid and/or the aqueous phase of the surfactant composition may be from about 6.5 to about 8.5.

In certain embodiments, the treatment fluids of the present disclosure may include any number of additives. Examples of such additives include, but are not limited to, additional salts, additional surfactants, acids, diverting agents, fluid loss control additives, gas, nitrogen, carbon dioxide, surface modifying agents, tackifying agents, foamers, corrosion inhibitors, scale inhibitors, catalysts, clay stabilizers, shale inhibitors, biocides, friction reducers, friction reducer viscosity enhancing agents, antifoam agents, bridging agents, flocculants, $H_2S$ scavengers, $CO_2$ scavengers, oxygen scavengers, lubricants, hydrocarbons, viscosifying/gelling agents, breakers, weighting agents, relative permeability modifiers, resins, wetting agents, coating enhancement agents, filter cake removal agents, antifreeze agents (e.g., ethylene glycol), particulates, chemical tracers, remediation solvents, and the like. A person skilled in the art, with the benefit of this disclosure, will recognize the types of additives that may be included in the treatment fluids of the present disclosure for a particular application.

In various embodiments, the present disclosure provides a method of treating a subterranean formation. In certain embodiments, the method includes into a wellbore penetrating at least a portion of a subterranean formation one or more organic compounds comprising a phosphonoalkyl moiety and/or a surfactant composition comprising an aqueous phase, an oil phase, one or more organic solvents, and one or more surfactants. In certain embodiments, the organic compound comprising a phosphonoalkyl moiety may be added to the surfactant composition before it is introduced into the wellbore.

The surfactant composition and the organic compound comprising a phosphonoalkyl moiety may be provided or introduced in any suitable fashion. In some embodiments, the surfactant composition and the organic compound comprising a phosphonoalkyl moiety may be provided together (either by themselves or with other optional components such as solvents and/or carrier fluids) and then mixed with the base fluid (and optionally other components) substantially simultaneously to form a treatment fluid of the present disclosure. In other embodiments, the surfactant composition and the organic compound comprising a phosphonoalkyl moiety may be mixed into the base fluid separately (either substantially simultaneously or at different times). When added separately, the relative amounts and/or ratios of the surfactant composition and the organic compound comprising a phosphonoalkyl moiety added to the treatment fluid may be varied throughout a particular fracturing operation. The surfactant composition and the organic compound comprising a phosphonoalkyl moiety also may be mixed into the treatment fluid in any order and at any place in the mixing or fracturing equipment used in a particular application of the present disclosure. For example, in some embodiments, the organic compound comprising a phosphonoalkyl moiety may be mixed into the fluid at the same injection point as the surfactant composition (e.g., eye of the discharge pump on a fracturing blender), or may be added to the fluid upstream or downstream of that injection point.

In certain embodiments, the surfactant composition and/or one or more organic compounds comprising a phosphonoalkyl moiety may be added to a treatment fluid comprising an aqueous base fluid that is, in turn, introduced into a wellbore penetrating at least a portion of a subterranean formation. For example, the treatment fluid may be a stimulation fluid, a hydraulic fracturing fluid, a drilling fluid, a spotting fluid, a clean-up fluid, a completion fluid, a remedial treatment fluid, a workover fluid, an abandonment fluid, a pill, an acidizing fluid, a cementing fluid, a packer fluid, a logging fluid, or a combination thereof. In certain embodiments, the base fluid may be mixed with the organic compound comprising a phosphonoalkyl moiety, the surfactant composition, and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted.

In introducing a treatment fluid of the present disclosure into a portion of a subterranean formation, the components of the treatment fluid may be mixed together at the surface (or offsite prior to transport to the wellsite) and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure. In some embodiments, the organic compound comprising a phosphonoalkyl moiety, the surfactant composition, and/or the various other components of the treatment fluids of the present disclosure may be mixed into the treatment fluid during some stages but not others. For example, the surfactant composition may be continuously mixed into the treatment fluid, while the organic compound comprising a phosphonoalkyl moiety is only added in selected stages, among other reasons, to enhance the hydrocarbon recovery during those stages.

In certain embodiments, at least a portion of the surfactant composition and/or the organic compound comprising a phosphonoalkyl moiety may be deposited within a portion of the subterranean formation, such as in a fracture, microfracture, flow pathway, or area surrounding the same. In certain embodiments, the surfactant composition and/or the organic compound comprising a phosphonoalkyl moiety may contact a surface in the subterranean formation, such as within a fracture, a microfracture, at least a part of an area surrounding a fracture, a flow pathway, an area surrounding a flow pathway, and an area desired to be fractured. In such embodiments, contacting the surface in the subterranean formation with the surfactant composition and/or the organic compound comprising a phosphonoalkyl moiety may cause a hydrocarbon (e.g., oil) within the subterranean formation to be displaced from the subterranean formation. In certain embodiments, the surfactant composition and/or the organic compound comprising a phosphonoalkyl moiety may interact with the surface in the subterranean formation to at least partially reduce the force requested to displace the hydrocarbon from the subterranean formation.

In certain embodiments, the subterranean formation may be a conventional formation that comprises calcium carbonate, a sodium silicate, an aluminum silicate, clayed materials, or any combination thereof. In other embodiments, the subterranean formation may be an unconventional shale formation. In certain embodiments, the subterranean formation may be oil-wet. As used herein to describe a subterranean formation, the term "oil-wet" refers to a subterranean formation in which oil is the wetting phase and water is the non-wetting phase. In an oil-wet subterranean formation, water alone (e.g., without a surfactant composition) may not provide sufficient force (e.g., force necessary to overcome the adhesion force associated with the surfaces of the subterranean formation and the oil) to displace oil from the subterranean formation.

In certain embodiments, the methods of the present disclosure may include hydraulically fracturing the subterranean formation with a hydraulic fracturing fluid including the surfactant composition and/or the organic compound comprising a phosphonoalkyl moiety, which may be added to the hydraulic fracturing fluid as part of the surfactant composition or separately. In such embodiments, the hydraulically fracturing may generate one or more fractures, microfractures, or flow pathways within the subterranean formation. In certain embodiments, the surfactant composition, the organic compound comprising a phosphonoalkyl moiety, or a treatment fluid comprising at least one of the surfactant composition and the organic compound comprising a phosphonoalkyl moiety may be introduced into a wellbore penetrating the subterranean formation separately from a hydraulic fracturing fluid. In such embodiments, the hydraulic fracturing may occur at any time with respect to one another; for example, the hydraulic fracturing may occur at least one of before, during, and after the contacting or placing. In some embodiments, the introduction of the surfactant composition, the organic compound comprising a phosphonoalkyl moiety, or a treatment fluid comprising at least one of the surfactant composition and the organic compound comprising a phosphonoalkyl moiety occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant).

In certain embodiments, the methods of the present disclosure may include performing a stimulation treatment at least one of before, during, and after introducing the surfactant composition, the organic compound comprising a phosphonoalkyl moiety, or a treatment fluid comprising at least one of the surfactant composition and the organic compound comprising a phosphonoalkyl moiety into the subterranean formation. The stimulation treatment may be, for example, at least one of perforating, acidizing, injecting of cleaning fluids, propellant stimulation, and hydraulic fracturing. In some embodiments, the stimulation treatment at least partially generates a fracture or flow pathway where the surfactant composition is placed in or contacted to, or the surfactant composition is placed in or contacted to an area surrounding the generated fracture or flow pathway.

FIG. 1 shows a well 100 during a fracturing operation in a portion of a subterranean formation of interest 102 surrounding a wellbore 104. The wellbore 104 extends from the surface 106, and the treatment fluid 108 is applied to a portion of the subterranean formation 102 surrounding the horizontal portion of the wellbore. Although shown as vertical deviating to horizontal, the wellbore 104 may include horizontal, vertical, slant, curved, and other types of wellbore geometries and orientations, and the fracturing treatment may be applied to a subterranean zone surrounding any portion of the wellbore. The wellbore 104 can include a casing 110 that is cemented or otherwise secured to the wellbore wall. The wellbore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro-jetting or other tools.

The well is shown with a work string 112 depending from the surface 106 into the wellbore 104. A pump and blender system 120 is coupled a work string 112 to pump the treatment fluid 108 into the wellbore 104. The working string 112 may include coiled tubing, jointed pipe, and/or other structures that allow fluid to flow into the wellbore 104. The working string 112 can include flow control devices 122 (e.g., bypass valves, ports, and or other tools or well devices) that control a flow of fluid from the interior of the working string 112 into the subterranean zone 102. For example, the working string 112 may include ports adjacent the wellbore wall to communicate a treatment fluid 108 (e.g., fracturing fluid, pad fluids, pre-pad fluids, spacer fluids, as well as other fluids) directly into the subterranean formation 102, and/or the working string 112 may include ports that are spaced apart from the wellbore wall to communicate treatment fluid 108 and/or other fluids into an annulus in the wellbore between the working string 112 and the wellbore wall. The working string 112 and/or the wellbore 104 may include one or more sets of packers 114 that seal the annulus between the working string 112 and wellbore 104 to define an interval of the wellbore 104 into which a treatment fluid 108 or other fluids will be pumped. FIG. 1 shows two packers 114, one defining an uphole boundary of the interval and one defining the downhole end of the interval.

In certain embodiments, the treatment fluid 108 may be introduced into the wellbore 104 at or above at or above a certain hydraulic pressure. In such embodiments, when the treatment fluid 108 (e.g., a fracturing fluid) is pumped into the desired interval of the wellbore 104 at or above a certain hydraulic pressure, the rock of the subterranean zone 102 "fractures," in that one or more fractures or cracks are created in the zone or one or more existing fractures or cracks in the zone 102 are enlarged or enhanced. In the embodiments shown, the rock matrix of the subterranean zone 102 is of a type that, when fractured, produces both a primary fracture 116 in the near field and secondary fractures 118 (e.g., induced, dendritic fractures or microfractures) in the far field.

The secondary fractures 118 have propagated from or near the ends and edges of the primary fracture 116. In certain instances, the subterranean zone 102 is a low permeability zone having a permeability of 1 mD or less. For example, the subterranean zone 102 can include a shale, tight gas, clay, and/or coal bed formation. In certain instances, the rock matrix of the subterranean zone 102 may include cleating or natural fractures (i.e., those that existed prior to, and were not caused by, a fracture treatment). The natural fractures tend to run generally in a direction that is parallel to the primary fracture 116. The secondary fractures 118 run in many directions including directions non-parallel and, in certain instances, perpendicular to the direction of the primary fracture 116. As a result, the secondary fracture 118 can cross, and thereby link, the natural fractures to the primary fracture 116. In certain embodiments, the proppant particulates in the treatment fluid 108 may enter and/or be deposited within one or more of the primary fracture 116 and/or the secondary fractures 108.

To facilitate a better understanding of the present disclosure, the following examples of certain aspects of certain embodiments are given. The following examples are not the only examples that could be given according to the present disclosure and are not intended to limit the scope of the disclosure or claims.

EXAMPLE

Three different surfactant compositions were prepared in accordance with certain embodiments of the present disclosure, as shown in Table 1 below. Eight treatment fluid samples were then prepared as shown in Table 2 below. Each sample contained 499 mL of 2% potassium chloride brine. The control sample, A, only contained the brine. Samples B, C, E, and G contained only a PMIDA salt (more specifically, metallated potassium diacetoamino-phosphonate) or one of the surfactant compositions of the present disclosure from Table 1.

Samples D, F, and H each contained the PMIDA salt and one of the surfactant compositions of the present disclosure from Table 1.

Eight samples of calcium carbonate cores (1 in. width and 2 in. length with 22-25% porosity) were saturated with about 5 mL of Niobrara crude oil (to >90% saturation of available porosity) before being aged at temperature of 95° C. for about 10 days. The initial oil saturations based on pore volume of core samples were calculated with a porosimeter and volume of oil inserted in the core. Following the aging time period, each of the eight samples was treated with one of the treatment fluid samples listed in Table 2 below for 17 days at room temperature. The results of are shown in FIGS. 2, 3, and 4A-C.

TABLE 1

| Surfactant Composition | 1 Component | vol. % | 2 Component | vol. % | 3 Component | vol. % |
|---|---|---|---|---|---|---|
| Aqueous Phase | deionized water | 20 | deionized water | 20 | deionized water | 20 |
| Oil Phase | N,N-dimethyl 9-decenamid | 20 | methyl 9-decenoate | 20 | dimethyl 2-methylglutarate | 20 |
| Co-Solvent | isopropanol | 30 | isopropanol | 30 | ethanol | 30 |
| Surfactants | $C_{12}$-$C_{14}$ secondary ethoxylated alcohol | 10 | $C_{12}$-$C_{14}$ secondary alcohol, ethoxylate | 5 | $C_{12}$-$C_{14}$ linear ethoxylated alcohol | 5 |
| | myristamidopropylamine oxide | 10 | tall oil diethanolamide | 5 | tall oil diethanolamide | 5 |
| | thyl, tallow amine ethoxylate | 10 | triethanolamine dodecylbenzene sulfonate | 5 | polyamine polyether | 5 |
| | — | — | Propoxylated and ethoxylated alkyl phenol resin | 5 | formaldehyde, polymer with 4-(1,1-dimethyl propyl) methyloxirane and oxirane | 5 |

TABLE 2

| Sample | Surfactant Composition | Surfactant Composition (wt. %) | MPMID (wt. %) |
|---|---|---|---|
| A | — | — | — |
| B | — | — | 2 |
| C | 1 | 0.2 | — |
| D | 1 | 0.2 | 2 |
| E | 2 | 0.2 | — |
| F | 2 | 0.2 | 2 |
| G | 3 | 0.2 | — |
| H | 3 | 0.2 | 2 |

Figure 2:
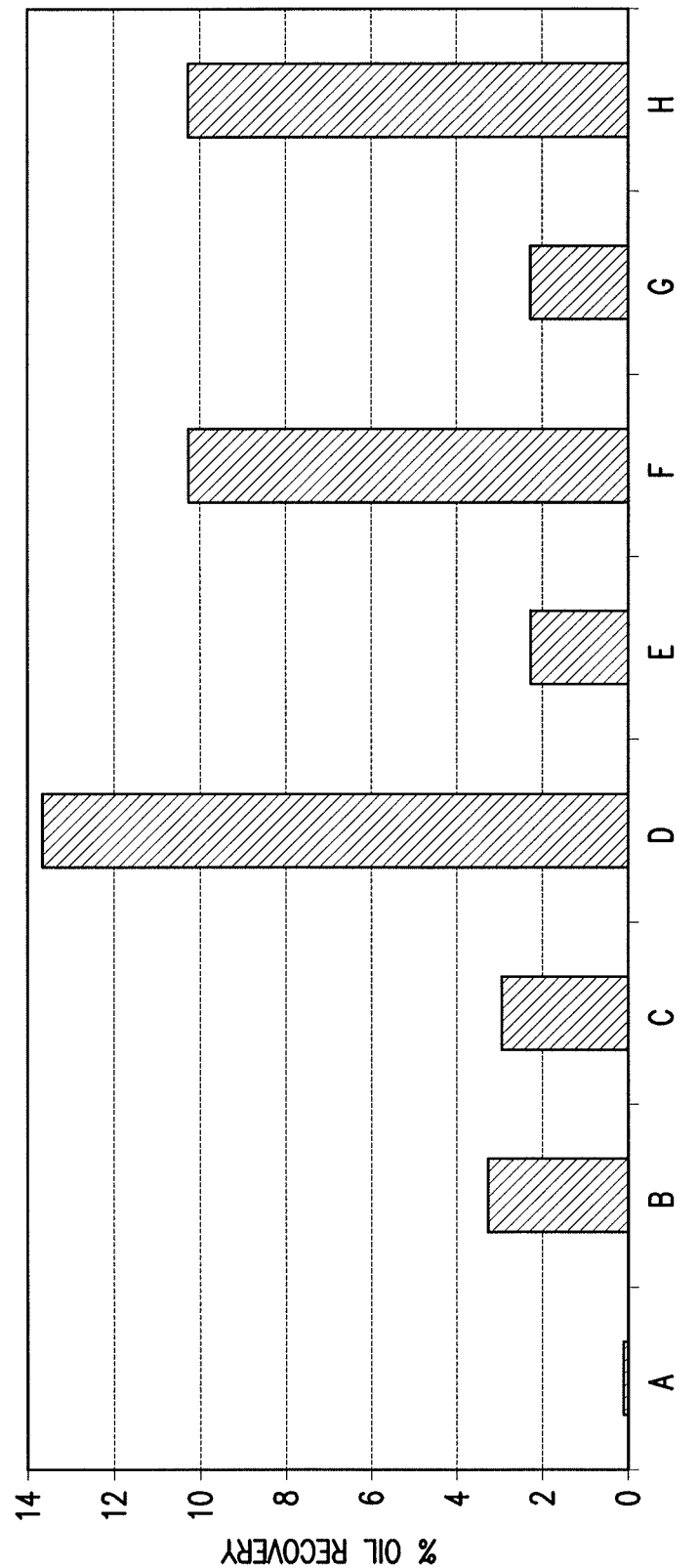
FIG. 2 is a graph illustrating data from oil recovery tests performed using compositions in accordance with certain embodiments of the present disclosure.

FIG. 2 is a graph showing the percentage of oil recovery achieved by the eight treatment fluid samples after 17 days. As shown in FIG. 2, the three samples that contained one of the surfactant compositions of the present disclosure from Table 1 and a PMIDA salt (Samples D, F, and H) each yielded a greater percentage of oil recovery than the other samples that contained only a surfactant composition (Samples C, E, and G or a PMIDA salt (Sample B), or neither (Sample A).

FIG. 3 is a graph illustrating the percentage of oil recovery achieved by six of the treatment fluid samples (Samples A-F) throughout the 17 days. As shown in FIG. 3, the samples containing one of the surfactant compositions of the present disclosure from Table 1 and a PMIDA salt (Samples D and F) not only yielded greater oil recovery but also yielded faster oil recovery than the other samples containing only a surfactant composition (Samples C, E) or a PMIDA salt (Sample B) or neither (Sample A).

Thus, this Example demonstrates the synergistic effect between the surfactant compositions of the present disclosure and organic compounds comprising a phosphonoalkyl moiety, particularly a PMIDA salt, that results in both greater oil recovery and faster oil recovery as compared to a surfactant composition or an organic compound comprising a phosphonoalkyl moiety alone.

An embodiment of the present disclosure is a method that includes: introducing a surfactant composition comprising an aqueous phase, an oil phase, an organic solvent, and one or more surfactants into a wellbore penetrating at least a portion of a subterranean formation; introducing an organic compound comprising a phosphonoalkyl moiety into the wellbore; and at least partially displacing a hydrocarbon from the subterranean formation by contacting a surface in the subterranean formation with the surfactant composition or the organic compound.

Another embodiment of the present disclosure is a method that includes: introducing into a wellbore penetrating at least a portion of a subterranean formation a surfactant composition comprising an aqueous phase, an oil phase, an organic solvent, and one or more surfactants; and introducing into the wellbore a N-(phosphonomethyl)iminodiacetic acid salt having the following structure:

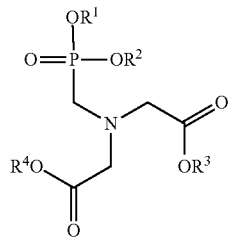

wherein $R^1$, $R^2$, $R^3$, and $R^4$ are each independently selected from the group consisting of: H, Li, Na, K, Cs, Be, Mg, Ca, Sr, Ba, Cr, Fe, Mn, Co, Ni, Cu, Ga, In, $NH_4$, and any combination thereof.

Another embodiment of the present disclosure is a composition that includes: (a) an aqueous phase; (b) an oil phase comprising at least one solvent; (c) an organic solvent; (d) one or more surfactants; and (e) at least one organic compound comprising a phosphonoalkyl moiety.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   introducing a surfactant composition comprising an aqueous phase, an oil phase, an organic solvent, and one or more surfactants into a wellbore penetrating at least a portion of a subterranean formation, wherein the one or more surfactants are selected from the group consisting of: a secondary alkoxylated alcohol surfactant, an alkylamine alkoxylate surfactant, an amine oxide surfactant, a fatty acid alkoxylate surfactant, an alkyl glycoside surfactant, an alkylamidopropyl betaine, an alkylamidopropyl hydroxysultaine, a ($C_{12}$ to $C_{16}$) alpha olefin sulfonate salt, a linear or branched alkyl diphenyl oxide disulfonate salt, a dialkyl sulfo succinate salt, a benzyldimethylalkylammonium chloride, and any combination thereof;
   introducing an organic compound comprising a phosphonoalkyl moiety into the wellbore wherein the surfactant composition, the organic compound comprising a phosphonoalkyl moiety, or both is added to a treatment fluid comprising an aqueous base fluid before being introduced into the wellbore and wherein the aqueous base fluid has a pH from about 4 to about 11; and
   at least partially displacing a hydrocarbon from the subterranean formation by contacting a surface in the subterranean formation with the surfactant composition or the organic compound.

2. The method of claim 1, wherein the surfactant composition is present in the treatment fluid in an amount from about 0.005 wt. % to about 5 wt. % by volume of the aqueous base fluid.

3. The method of claim 1, wherein the organic compound is present in the treatment fluid in an amount from about 0.005 wt. % to about 60 wt. % by volume of the aqueous base fluid.

4. The method of claim 1, wherein the surfactant composition and the organic compound are combined in the treatment fluid before being introduced into the subterranean formation.

5. The method of claim 1, wherein the surfactant composition comprises the organic compound in an amount from about 0.005 wt. % to about 10 wt. % by volume of the aqueous phase.

6. The method of claim 1, wherein the organic compound comprising a phosphonoalkyl moiety has the following structure:

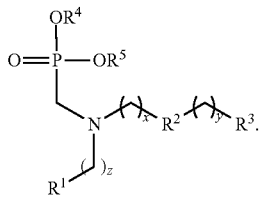

wherein R¹ is selected from the group consisting of: a ($C_1$ to $C_{10}$) alkyl, a ($C_1$ to $C_{10}$) alkenyl, a ($C_1$ to $C_{10}$) alkynl, an acyl, an aryl, acetate, a hydrogen atom, and a phosphonate;

wherein R² is selected from the group consisting of: a ($C_1$ to $C_6$) alkyl, a ($C_1$ to $C_{10}$) alkenyl, a ($C_1$ to $C_{10}$) alkynl, an acyl, an aryl, acetate, a hydrogen atom, a phosphonate, and a phosphonoalkylamine;

wherein R³ is selected from the group consisting of: a ($C_1$ to $C_{10}$) alkyl, a ($C_1$ to $C_{10}$) alkenyl, a ($C_1$ to $C_{10}$) alkynl, an acyl, an aryl, acetate, a hydrogen atom, and a phosphonoalkylamine;

wherein R⁴ and R⁵ are each independently selected from the group consisting of: a ($C_1$ to $C_{10}$) alkyl, a ($C_1$ to $C_{10}$) alkenyl, a ($C_1$ to $C_{10}$) alkynl, an acyl, an aryl, acetate, H, Li, Na, K, Cs, Be, Mg, Ca, Sr, Ba, Cr, Fe, Mn, Co, Ni, Cu, Ga, In, $NH_4$, and a phosphonoalkylamine;

wherein x is an integer in the range from about 1 to about 6; and wherein y an integer in the range from about 0 to about 6.

7. The method of claim 1, wherein the oil phase comprises at least one solvent selected from the group consisting of: methyl 9-decenoate, 1-dodecyl-2-pyrrolidinone, dimethyl 2-methylglutarate, N, N-dimethyl 9-decenamide, n-methylpyrrolidone, dimethyl glutarate, dimethyl succinate, dimethyl adipate, and any combination thereof.

8. The method of claim 1, wherein the oil phase comprises one or more petroleum distillates.

9. A method comprising:
introducing into a wellbore penetrating at least a portion of a subterranean formation a surfactant composition comprising an aqueous phase, an oil phase, an organic solvent, and one or more surfactants selected from the group consisting of: a secondary alkoxylated alcohol surfactant, an alkylamine alkoxylate surfactant, an amine oxide surfactant, a fatty acid alkoxylate surfactant, an alkyl glycoside surfactant, an alkylamidopropyl betaine, an alkylamidopropyl hydroxysultaine, a ($C_{12}$ to $C_{16}$) alpha olefin sulfonate salt, a linear or branched alkyl diphenyl oxide disulfonate salt, a dialkyl sulfo succinate salt, a benzyldimethylalkylammonium chloride, and any combination thereof; and
introducing into the wellbore a N-(phosphonomethyl)iminodiacetic acid salt having the following structure:

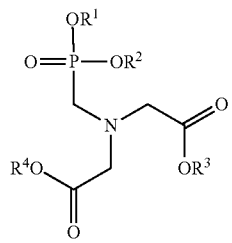

wherein R¹, R², R³, and R⁴ are each independently selected from the group consisting of: H, Li, Na, K, Cs, Be, Mg, Ca, Sr, Ba, Cr, Fe, Mn, Co, Ni, Cu, Ga, In, $NH_4$, and any combination thereof, wherein the surfactant composition, the N-(phosphonomethyl)iminodiacetic acid salt, or both is added to a treatment fluid comprising an aqueous base fluid before being introduced into the wellbore and wherein the aqueous base fluid has a pH from about 4 to about 11.

10. The method of claim 9, wherein the surfactant composition is present in the treatment fluid in an amount from about 0.005 wt. % to about 5 wt. % by volume of the aqueous base fluid.

11. The method of claim 9, wherein the N-(phosphonomethyl)iminodiacetic acid salt is present in the treatment fluid in an amount from about 0.005 wt. % to about 60 wt. % by volume of the base fluid.

12. The method of claim 9, further comprising adding the N-(phosphonomethyl)iminodiacetic acid salt to the surfactant composition in an amount from about 0.005 wt. % to about 10 wt. % by volume of the aqueous phase of the surfactant composition.

13. A composition comprising:
(a) a surfactant composition comprising:
(i) an aqueous phase;
(ii) an oil phase comprising at least one solvent;
(iii) an organic solvent; and
(iv) one or more surfactants selected from the group consisting of: a secondary alkoxylated alcohol surfactant, an alkylamine alkoxylate surfactant, an amine oxide surfactant, a fatty acid alkoxylate surfactant, an alkyl glycoside surfactant, an alkylamidopropyl betaine, an alkylamidopropyl hydroxysultaine, a ($C_{12}$ to $C_{16}$) alpha olefin sulfonate salt, a linear or branched alkyl diphenyl oxide disulfonate salt, a dialkyl sulfo succinate salt, a benzyldimethylalkylammonium chloride, and any combination thereof;
(b) at least one organic compound comprising a phosphonoalkyl moiety; and
(c) an aqueous base fluid comprising a brine wherein the aqueous base fluid has a pH from about 4 to about 11.

14. The composition of claim 13, wherein the organic compound is a N-(phosphonomethyl)iminodiacetic acid salt having the following structure:

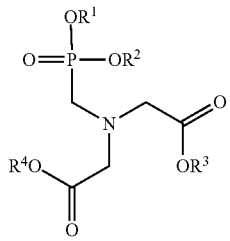

wherein R¹, R², R³, and R⁴ are each independently selected from the group consisting of: H, Li, Na, K, Cs, Be, Mg, Ca, Sr, Ba, Cr, Fe, Mn, Co, Ni, Cu, Ga, In, $NH_4$, and any combination thereof.

15. The composition of claim 13, wherein components (i)-(iv) form a microemulsion, wherein the base fluid comprises the microemulsion in an amount from about 0.005 wt. % to about 5 wt. % by volume of the base fluid, and wherein the base fluid comprises the organic compound in an amount from about 0.005 wt. % to about 60 wt. % by volume of the base fluid.

16. The composition of claim 13, wherein components (a)-(b) form a microemulsion, wherein the base fluid comprises the microemulsion in an amount from about 0.005 wt. % to about 5 wt. % by volume of the base fluid, and wherein the aqueous phase comprises the organic compound in an amount from about 0.005 wt. % to about 10 wt. % by volume of the aqueous phase.

17. The composition of claim 16, wherein the emulsion has a droplet size of from about 0.001 microns to about 5 mm.

18. The method of claim 13, wherein the at least one solvent is selected from the group consisting of: methyl 9-decenoate, 1-dodecyl-2-pyrrolidinone, dimethyl 2-methylglutarate, N, N-dimethyl 9-decenamide, n-methylpyrrolidone, dimethyl glutarate, dimethyl succinate, dimethyl adipate, and any combination thereof.

19. The composition of claim 13, wherein the oil phase comprises one or more petroleum distillates.

20. The composition of claim 13, wherein the oil phase has a boiling point range of from about 100° C. to about 300° C.

* * * * *